United States Patent [19]

Morikawa et al.

[11] 4,433,229

[45] Feb. 21, 1984

[54] ELECTRODE ROLL FOR RESISTANCE WELDING

[75] Inventors: Yonekichi Morikawa, Shizuoka; Toshio Shimizu; Eiichi Yoshida, both of Shimizu; Tsuyoshi Konagaya, Yaizu; Keizo Hirayama, Tokyo, all of Japan

[73] Assignee: Daiwa Can Company, Limited, Tokyo, Japan

[21] Appl. No.: 321,927

[22] Filed: Nov. 16, 1981

[30] Foreign Application Priority Data

Nov. 29, 1980 [JP] Japan ................. 55-168321

[51] Int. Cl.³ .................. B23K 11/06; H01R 39/30
[52] U.S. Cl. .................. 219/84; 219/119; 339/5 L
[58] Field of Search ............ 219/84, 119, 81; 339/5 R, 5 L, 5 M, 5 P, 5 RL, 5 S, 6 R, 6 A, 6 RL, 8 R, 8 A, 8 L, 8 P, 8 PB, 8 PS, 8 RL

[56] References Cited

U.S. PATENT DOCUMENTS 4,188,523 2/1980 Kawai et al. ................. 219/84

FOREIGN PATENT DOCUMENTS 2351534 3/1975 Fed. Rep. of Germany ........ 219/84
2805345 8/1979 Fed. Rep. of Germany ........ 219/84
1190504 5/1970 United Kingdom .

Primary Examiner—Roy N. Envall, Jr.
Assistant Examiner—Alfred S. Keve
Attorney, Agent, or Firm—Wenderoth, Lind & Ponack

[57] ABSTRACT

An electrode roll for resistance welding comprising a fixed portion which has a disc portion at the longitudinal center part of a shaft where the disc portion and the shaft are at right angles to each other; a rotary portion which surrounds the fixed portion and has inner surfaces forming two side gaps facing the two side surfaces of the disc portion and a peripheral gap facing the peripheral surface of the disc portion, respectively; and a conductive liquid metal received in each of the gaps, where the peripheral gap is so narrow that the above conductive liquid metal may be pulled up along the gap to fill the same when the above rotary portion rotates, and the side gaps are substantially wider than the peripheral gap.

3 Claims, 6 Drawing Figures

Fig. 3
Fig. 4
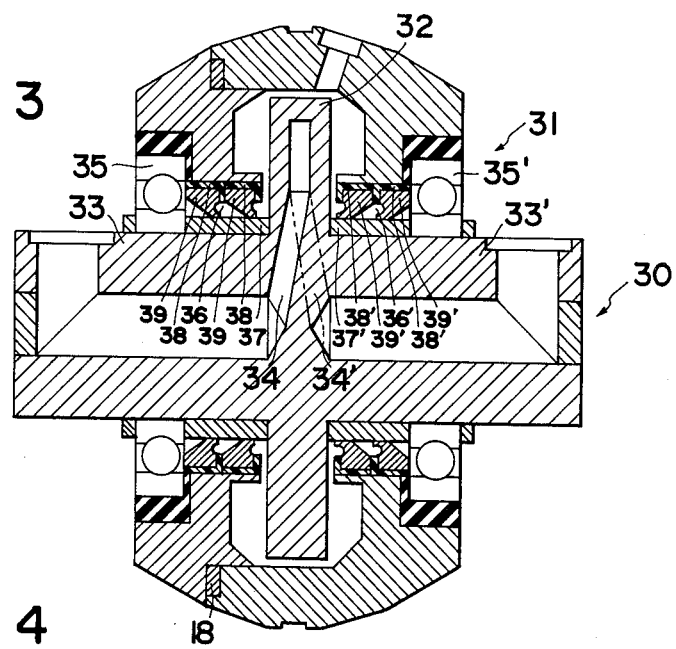
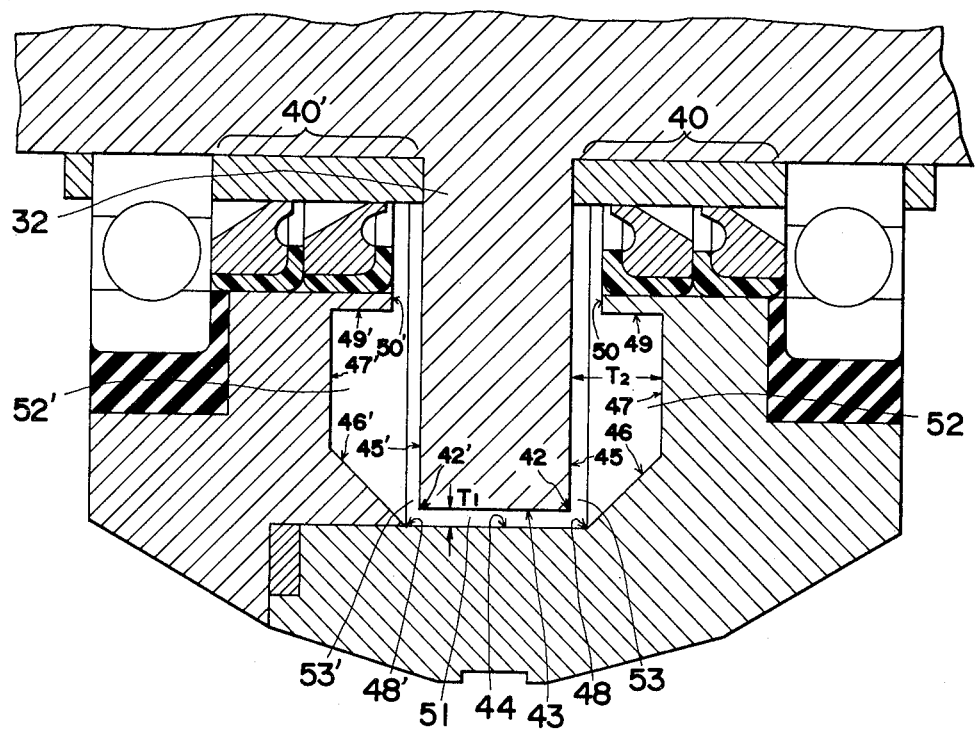

ELECTRODE ROLL FOR RESISTANCE WELDING

BACKGROUND OF THE INVENTION

The present invention relates to a rotary electrode roll for resistance welding with a built-in liquid metal as a conductive medium which is used when the seam on the sides of the bodies of steel-made cans is subjected to electric resistance welding.

The welding step performed in accordance with the prior art will be explained with reference to FIG. 1.

First, can body blanks which have been cut into a given size are taken out from their stacking station 1 piece by piece to be formed into tubular bodies. The formed tubular bodies 2 are transferred to the right in the drawing with the overlapped portion on the side to be formed into a seam being at the top, so that the overlapped portion passes between an upper circular electrode roll 3 fixed to a shaft 6 fitted rotatably into a part of an upper arm 5 and rotating in the direction of the arrow a and a lower circular electrode roll 4 which has a rotary portion which can rotate freely around a fixed portion fixed at an end of a lower arm 7. The overlapped portion is heated by the electric resistance produced when it passes through the two electrodes, and the heated portion is pressed and welded.

Next, the lower circular electrode roll 4 used for the welding of the can bodies mentioned above is shown in FIG. 2.

FIG. 2 is a sectional view of the electrode roll 4 through the axis of rotation thereof, showing the fixed portion 8, and the 8 rotary portion 9 provided around the fixed portion 8 in a freely rotatable manner. The fixed portion 8 is a stepped tubular form comprising a disc portion 11 at the longitudinal center part of the shaft of said tubular form, and end portions 10 and 10' having a diameter smaller than that of the disc portion 11 and provided on the two respective side surfaces of said disc portion diameter, and a channel 13 is provided along the axis of the shaft; the two ends of channel 13 are sealed by blind patches 14 and 14'. Opening 15 and 15' for fixing pipes provided at the end portions 10 and 10' communicate with channel 13, and pipes (not shown) are fixed in the openings 15 and 15'.

The rotary portion 9 provided around the fixed portion 8 in a freely rotatable manner comprises a right member 16 and a left member 17, and the two members 16 and 17 are joined in an airtight manner with the aid of an airtight packing 18. Here, as is shown in the drawing, the two end portions of each of the left and right members are fitted around the end portions 10 and 10' of the fixed portion 8 having a smaller diameter in a freely rotatable manner through ball bearings 19 and 19'.

Rotary portion 9 has inner surfaces 25, 25' and 26 facing the two outer side surfaces 12 and 12' and the peripheral surface 20 of the disc portion 11 of the fixed portion 8 being, and gaps 27, 27' and 28 being almost equal to each other in width are formed between the rotary portion 9 and the disc portion 11. A conductive liquid metal is received in gaps 27, 27' and 28 to such an extent that said gaps are filled with the liquid metal almost entirely. A bolt pore 29 extends from the surface of the right member 16 to the gaps for injecting the conductive liquid metal into the gaps.

Further, in order to use pure gallium and other readily melting gallium metals such as binary metals including gallium/indium and gallium/tin as the conductive liquid metal for use in the electrode roll, metal rings 22 and 22' made of a hard metal, which function as isolation parts 24 and 24' for isolating said gaps from the outside of the electrode roll, are provided to the rotary portion 9 through elastic rings 21 and 21' positioned in the respective spaces between gaps 27 and 27' and the ball bearings 19 and 19'; metal rings 22 and 22' are constructed in such a manner that along the whole periphery they are slidably in contact with fixed metal rings 23 and 23' made of a hard metal fitted over the base of the disc portion 11 of the fixed portion 8. Lubricating oil is provided in the neighborhood of said sliding portion.

In addition, as a means for preventing the oxidation of the readily melting gallium metal, the interior of the gaps 27, 27' and 28 is filled with pressurized nitrogen gas after said readily melting metal is received in the gaps.

The above-mentioned readily melting metal consisting mainly of gallium is extremely easy to oxidize, and its oxide lowers the conductive function of the readily melting metal. Therefore, the isolation parts 24 and 24' mentioned above are provided as a means for preventing of oxidation. But, nevertheless, it has been known that the oxidation progresses, though gradually, by the contact with the oil for lubricating the isolation parts, thereby shortening the life span of the readily melting metal used as a conductive medium.

SUMMARY OF THE INVENTION

The main object of the present invention is to prolong the life span of the electrode roll for resistance welding explained above.

According to the present invention, there is provided an electrode roll for resistance welding which comprises a fixed portion which is a stepped tubular form having a disc portion of a larger diameter at the longitudinal center part of a shaft than at the side parts thereof; a rotary portion which surrounds the fixed portion, is supported in a freely rotatable manner by the end portions of a smaller diameter of the disc portion and has inner surfaces forming two side gaps which face the two the surfaces of said disc portion and a peripheral gap which faces the peripheral surface of the disc portion, respectively; and isolation parts which isolate the three gaps airtightly from the outside, where lubricating oil is held in isolated portions, and a conductive liquid metal is received in the three gaps, characterized in that, of the gaps, the peripheral gap has a width which enables it to pull up the conductive liquid metal therealong when the rotary portion rotates to fill up the peripheral gap with the metal;

the two sides gaps have a larger width than the width of the peripheral gap; and the amount of the conductive liquid metal which is received in the side gaps is such that the peripheral gap is sufficiently filled with the metal, but the metal does not enter the isolated portions when said electrode roll is allowed to stand with the shaft of the fixed portion oriented horizontally.

Here, the conductive liquid metal may be a readily melting gallium metal.

In addition, pressurized nitrogen gas may be introduced into the respective gaps after the conductive liquid metal is enclosed.

BRIEF EXPLANATION OF THE DRAWINGS

FIG. 3 is a sectional view of an example of the electrode roll of the present invention cut along a surface through the axis of the roll;

FIG. 4 is an enlarged view of the lower portion of the electrode roll shown in FIG. 3;

DETAILED DESCRIPTION OF THE PREFERRED EMBODIMENTS OF THE INVENTION

Examples of the electrode roll of the present invention will be explained with reference to the drawings.

Figure 1:
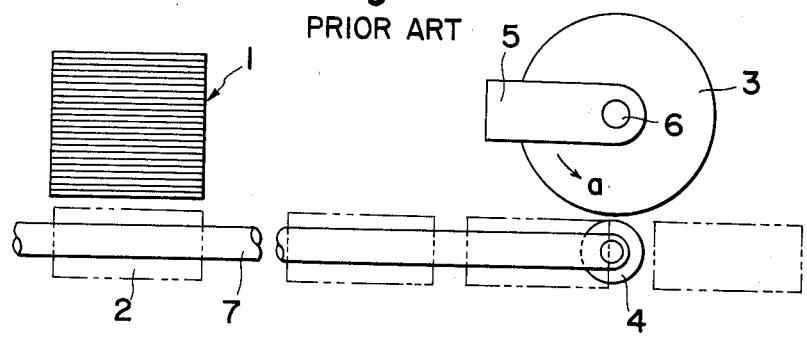
FIG. 1 is a schematic view of the previously known welding step for the seam on the sides of can bodies.
Figure 2:
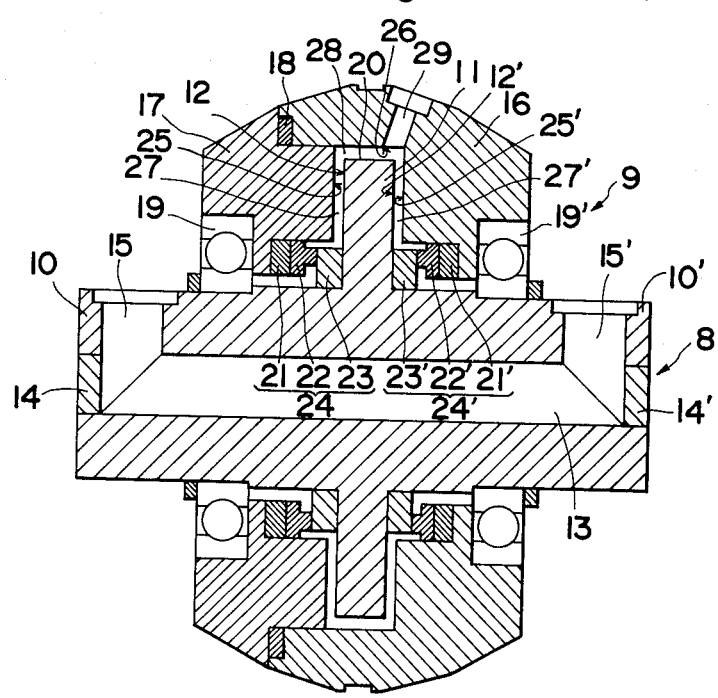
FIG. 2 is a sectional view of an example of the prior art lower circular electrode roll.

The construction which the electrode roll of the present invention shown in FIGS. 3 and 4 must have to accomplish the objects of the present invention, and which are different from those of the prior art electrode roll shown in FIG. 2, are as follows:

First, the width of the side gaps of the electrode roll shown in FIG. 2 formed between the two side surfaces 12 and 12' of the disc portion 11 of the fixed portion 8 and the inner surfaces 25 and 25' of the rotary portion 9 are made larger. That is, in FIGS. 3 and 4, the inner surface of a rotary portion 31 facing two side surfaces 45 and 45' of the disc portion of larger diameter 32 of a fixed portion 30 comprises, if the explanation is made with reference to only the right half of the drawing, an inclined surface 46 which extends outwards from the edge 48 of the inner surface 44 facing the peripheral surface 43 of the disc portion 32 across a gap 51, a vertical surface 47 which follows the inclined surface 46 (the vertical surface 47 is in parallel with the side 45 of the disc portion) and a horizontal surface 49 which is contiguous with vertical surface 47 and extends toward the disc portion 32. Horizontal surface 49 does not reach the side surface 45 of the disc portion 32 and is contiguous at its innermost edge with a small vertical surface 50. (The left half of the drawing has almost the same construction, so the explanation thereabout is omitted, and the corresponding portions are designated by the same numbers with a hyphen).

The inclined surfaces 46 and 46', the vertical surfaces 47 and 47', the horizontal surfaces 49 and 40' and the small vertical surfaces 50 and 50' which are inside of the rotary portion 31, annularly surround end portions 33 and 33' of fixed portion 30, which have a smaller diameter then that of the disc portion 32.

The peripheral gap 51 facing the peripheral surface 43 of the disc portion 32 a narrow gap, and is communicates with side gaps 52 and 52' facing the side surfaces of the disc portion 32 at each of the narrowest portions 53 and 53' of said gaps 52 and 52' between the inclined surfaces 46 and 46' and the sides 45 and 45' of the disc portion.

In this example, the width $T_1$ (FIG. 4) of the narrow peripheral gap 51 was designed to be 0.5 mm, and the two edges 48 and 48' of the inner surface 44 of the rotary portion was located at an angle of about 45° outwards from the two edges 42 and 42' of the peripheral surface 43 of the disc portion 32 to form the inclined surfaces 46 and 46' extending outwards from the two edges 48 and 48' at an angle of about 45° thereby making the width $T_2$ of the gap between the vertical surfaces 47 and 47' of the rotary portion and the two side surfaces 45 and 45' of the disc portion of the fixed portion about 3 mm.

A readily melting gallium metal in an amount of 0.5 cc was injected into peripheral gap 51 and side gaps 52 and 52' in an atmosphere of pressurized nitrogen gas. This amount, 0.5 cc, injected in the gaps is such an amount as to be completely received in well the gaps below the horizontal surface 49 and 49' when the electrode roll is allowed to stand with the shaft being horizontal, and thus the metal cannot go up over said horizontal surfaces 49 and 49' to contact with isolation parts 40 and 40'; the amount is sufficient to fill the whole gap 51 between the peripheral surface 43 of the disc portion and the inner surface 44 of the rotary portion.

Here, in this example, as is shown in FIGS. 3 and 4, the isolation parts 40 and 40' were constructed of hard metal-made ring parts 37 and 37' which were inserted in the end portions 33 and 33' of smaller diameter of the fixed portion and located in contact with the disc portion 32 and hard metal-made ring-like slide parts 39 and 39' facing ring parts 37 and 37', fixed to the rotary portion through phenol aldehyde resin-made elastic parts 38 and 38' adhered to the rotary portion and designed in such a manner that they can slide on the peripheral surfaces of the ring parts 37 and 37'. Two slide parts 39 and 39', respectively, are provided at the opposite sides of the disc portion 32, and lubricating oil is held in the gaps (spaces) 36 and 36' between the two slide parts. Here, the isolation part available for use in the present invention is not limited to the type shown, and may be the well known oil seal ring.

A path 34 for cooling water was made in the inside of the disc portion to directly cool the disc portion, and an electric insulating material was inserted between ball bearings 35 and 35' and the rotary portion 31.

When the rotary portion of this example of the electrode roll was made of a transparent resin and was rotated at a speed of about 250 rpm, it was confirmed that the readily melting metal filled the gap 51 facing the peripheral surface 43 of the disc portion along the whole periphery of the disc portion. Then, the rotary portion was made of the same type copper as for the prior art electrode roll and rotated at about 250 rpm by using it as a lower roll of a welder. When many can bodies to be welded are conveyed to the welder successively, and an electric current was applied to them for welding, the welding of the seam on the side of the can bodies were all good.

This electrode roll was removed from the welder, and was run continuously while applying an electric current thereto using a tester and warming. Even 30 days after the continuous run, the roll was rotatable.

Figure 5:
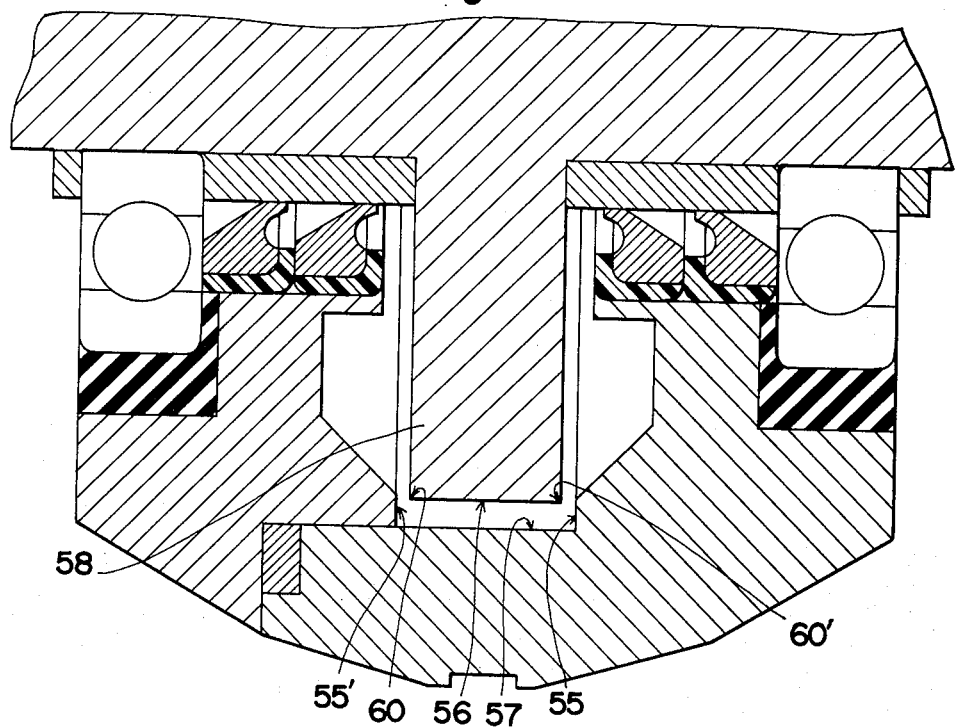
FIG. 5 is an enlarged view of the lower portion of another example of the electrode roll of the present invention.
Figure 6:
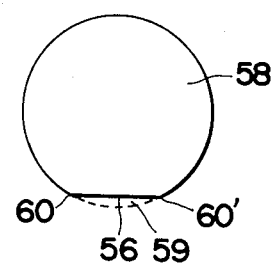
FIG. 6 is a perspective schematic illustration of the lower portion of the disc portion of larger diameter of the electrode roll shown in FIG. 5.

Another example of the present invention is explained with reference to FIG. 5. The electrode roll shown in FIG. 5 is different from that shown in FIG. 4 in that the underside of the disc portion of larger diameter 58 of the fixed portion 30 when the fixed portion was fixed by a convenient means is cut as is shown in FIG. 6, and the rotary portion was provided with small annular vertical walls 55 and 55' which extend to the positions corresponding to the edges 60 and 60' of the cutting line 56.

When the construction of this example is employed, as compared with the case where there is no cutting, a larger amount of the readily melting metal is kept under the disc portion of larger diameter, and thus there is an advantage in that when the rotary portion rotates, the readily melting metal, namely the conductive liquid metal, is pulled up rapidly and without interruption into the narrow gap facing the peripheral surface of the disc portion.

In the electrode roll of the present invention, the width of the peripheral gap is designed to be such that the conductive liquid metal is pulled up along the peripheral gap and fills said gap when the rotary portion rotates. Further, a sufficient amount of the liqud metal to fill the peripheral gap at the time of the rotation of the rotary portion is received in the gaps. As a result, a sufficient amount of an electric current for the welding is applied to the rotary portion through the fixed portion and the liquid metal in the peripheral gap, thereby making it possible to provide the material to be welded with a predetermined welding strength.

In addition, the width of each of the side gaps is made larger, and therefore, even if the gaps receive a sufficient amount of a conductive liquid metal to fill the peripheral gap, the liquid metal received is at a level below the isolation parts and therefore does not flow into the isolation parts when the electrode roll is allowed to stand with its shaft extending horizontally. Accordingly, in either case of rotation or standing, the liquid metal does not contact the isolation parts and thus cannot enter the spaces therein and does not cause oxidation by the contact with the lubricating oil in the spaces, and further there is no possibility that the conductive liquid metal will leak. Therefore, there is provided an advantage in that prolonged use of the roll is possible.

We claim:

1. In an electrode roll for resistance welding which includes a fixed portion of stepped tubular form including a shaft and a disc portion at the longitudinal center of said shaft, said disc portion having opposite side surfaces, a peripheral surface and a diameter which is larger than the diameter of said shaft; a rotary portion surrounding said fixed portion, supported in a freely rotatable manner by the end portions of said shaft and having inner surfaces which respectively face said opposite side surfaces of said disc portion to define respective side gaps therebetween, and face said peripheral surface of said disc portion to define a peripheral gap therebetween; and isolation parts adjacent said fixed portion which isolate said side gaps and said peripheral gap air-tightly from the outside and define isolated spaces therein for holding lubricating oil, a conductive liquid metal being held in said side gaps and said peripheral gap, the improvement wherein:

said peripheral gap has a width which enables it to pull up said conductive liquid metal along said peripheral gap when said rotary portion rotates, so as to fill up said peripheral gap with said conductive liquid metal;

said side gaps each having a larger width than said width of said peripheral gap; and the widths of said side gaps and peripheral gap being such, and the amount of said conductive liquid metal held in said side gaps and said peripheral gap being sufficient, that said peripheral gap is filled up with said conductive liquid metal during rotation of said rotary portion, and the level of said conductive liquid metal in said side gaps is below said isolation parts so as not to enter said isolated spaces, when said electrode roll is allowed to stand nonrotatively with said shaft of said fixed portion extending horizontally.

2. The improvements as in claim 1 where said conductive liquid metal is a readily melting gallium metal.

3. The improvement as in claim 1 or claim 2, wherein said side gaps and said peripheral gap contain pressurized nitrogen gas injected into said side gaps and peripheral gap after the introduction of said conductive liquid metal.

* * * * *